United States Patent
Pyne et al.

(10) Patent No.: US 8,179,564 B2
(45) Date of Patent: May 15, 2012

(54) DATA FOR DRIVING AN INKJET PRINT HEAD

(75) Inventors: Matthew Pyne, Toft (GB); Frederick Cheung, Toft (GB)

(73) Assignee: Cametrics Ltd., Cambridge (GB)

( * ) Notice: Subject to any disclaimer, the term of this patent is extended or adjusted under 35 U.S.C. 154(b) by 594 days.

(21) Appl. No.: 12/300,904

(22) PCT Filed: May 10, 2007

(86) PCT No.: PCT/GB2007/050254
§ 371 (c)(1),
(2), (4) Date: May 13, 2009

(87) PCT Pub. No.: WO2007/132265
PCT Pub. Date: Nov. 22, 2007

(65) Prior Publication Data
US 2010/0013881 A1     Jan. 21, 2010

(30) Foreign Application Priority Data
May 15, 2006    (GB) .................................. 0609570.7

(51) Int. Cl.
G06F 15/00    (2006.01)

(52) U.S. Cl. ................. 358/1.8; 347/9; 347/20; 347/40; 347/44; 347/47

(58) Field of Classification Search .................... None
See application file for complete search history.

(56) References Cited

U.S. PATENT DOCUMENTS

| | | | |
|---|---|---|---|
| 4,930,915 A * | 6/1990 | Kikuchi et al. | 400/175 |
| 4,972,270 A * | 11/1990 | Kurtin et al. | 358/296 |
| 4,978,971 A * | 12/1990 | Goetz et al. | 347/5 |
| 5,049,898 A | 9/1991 | Arthur et al. | |
| 5,642,948 A * | 7/1997 | Harris et al. | 400/124.28 |
| 6,068,359 A * | 5/2000 | Inose et al. | 347/5 |
| 6,106,094 A * | 8/2000 | Otani et al. | 347/19 |
| 6,109,727 A * | 8/2000 | Akahira et al. | 347/42 |
| 6,609,845 B1 * | 8/2003 | Ninomiya | 400/124.08 |
| 6,702,419 B2 * | 3/2004 | Stoessel et al. | 347/19 |
| 6,837,562 B2 * | 1/2005 | Nunokawa | 347/14 |
| 6,860,585 B2 * | 3/2005 | Serra et al. | 347/40 |
| 7,108,370 B2 * | 9/2006 | Breton | 347/109 |
| 7,249,815 B2 * | 7/2007 | Keller et al. | 347/9 |

(Continued)

FOREIGN PATENT DOCUMENTS

EP    0 400 652    12/1990

(Continued)

*Primary Examiner* — King Poon
*Assistant Examiner* — Dung Tran (57) ABSTRACT

A method of generating data for driving an ink jet print head having a plurality of nozzles to print a portion of an image comprising a plurality of pixels comprises storing nozzle position data defining spatial positions of the nozzles with respect to the print head in terms of pixel offsets from a reference position on the print head; reading image data for the image, the image data comprising data for the plurality of pixels; inputting head position data defining a position for the print head; and processing the image data using the head position data and the nozzle position data to determine nozzle firing data for controlling the print head to deposit ink at the spatial positions of the nozzles with respect the head position in accordance with the image data.

7 Claims, 8 Drawing Sheets

U.S. PATENT DOCUMENTS

| | | | |
|---|---|---|---|
| 7,289,246 B2 * | 10/2007 | Takahashi et al. | 358/1.9 |
| 7,344,231 B2 * | 3/2008 | Talon et al. | 347/85 |
| 7,591,526 B2 * | 9/2009 | Mitsuzawa | 347/20 |
| 7,907,307 B2 * | 3/2011 | Yamazaki | 358/3.03 |
| 2002/0196298 A1 * | 12/2002 | Cheng et al. | 347/9 |
| 2003/0030715 A1 | 2/2003 | Cheng et al. | |
| 2004/0032447 A1 * | 2/2004 | Serra et al. | 347/20 |
| 2004/0032452 A1 * | 2/2004 | Serra | 347/40 |
| 2005/0018032 A1 | 1/2005 | Walling | |
| 2005/0052495 A1 | 3/2005 | Matsui | |
| 2006/0227159 A1 * | 10/2006 | Nakajo | 347/15 |
| 2007/0046706 A1 * | 3/2007 | Kayahara et al. | 347/14 |
| 2009/0009812 A1 * | 1/2009 | Sirringhaus et al. | 358/3.26 |

FOREIGN PATENT DOCUMENTS

| | | |
|---|---|---|
| EP | 0 765 762 A1 | 4/1997 |

* cited by examiner

| | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 2000 | 0 | 0 | 0 | 0 | 0 | 40 | 80 | C0 | FF | FF | 0 | 0 | 0 | 0 | 0 | 0 |
| 2010 | 0 | 0 | 0 | 0 | 40 | 80 | C0 | FF | FF | FF | 0 | 0 | 0 | 0 | 0 | 0 |
| 2020 | 0 | 0 | 0 | 40 | 80 | C0 | FF | FF | FF | FF | 0 | 0 | 0 | 0 | 0 | 0 |
| 2030 | | | | | | | | | | | | | | | | |

DATA FOR DRIVING AN INKJET PRINT HEAD

FIELD OF THE INVENTION

The invention is concerned generally with ink jet printing, in particular to methods and apparatus for printing using print heads having a plurality of nozzles and to related print engines.

BACKGROUND TO THE INVENTION

Ink jet printers are known in the art for printing images onto a medium (e.g. paper) using a variety of different inks. Ink jet printers also have applications in materials deposition, including functional and non-functional materials (e.g. for fabricating circuits and/or display devices on a variety of substrates). They have many advantages over other forms of printing, in particular they may be configured to print large areas in colour or black and white relatively quickly and they are relatively inexpensive compared with other printing technologies. Background prior art can be found in US 2003/0030715; US 2005/0018032; and U.S. Pat. No. 5,049,898.

It would be advantageous to provide an ink jet printer where the controller software may be configured to accept different print heads and/or different print head orientations, and whereby the printer may be reconfigured for a new print head or print head orientation without replacing the controller software. This would allow the user more choice in terms of print quality versus volume for the same print head, and/or the choice of different sized print heads (and different shapes) for different purposes (and different budgets) and reduce support costs for manufacturers.

SUMMARY OF THE INVENTION

According to an aspect of the present invention, there is provided a method of generating data for driving an ink jet print head having a plurality of nozzles to print a portion of an image comprising a plurality of pixels, the method comprising storing nozzle position data defining spatial positions of said nozzles with respect to said print head in terms of pixel offsets from a reference position on said print head, reading image data for said image, said image data comprising data for said plurality of pixels, inputting head position data defining a position for said print head, processing said image data using said head position data and said nozzle position data to determine nozzle firing data for controlling said print head to deposit ink at said spatial positions of said nozzles with respect said head position in accordance with said image data.

Preferably the image data is stored in a memory in pixel order in the image memory space, by using a memory location for each pixel. For example 8 bits per pixel for an 8 bit wide memory (e.g. for a monochrome printer) or 32 bits per pixel for a 32 bit wide memory (e.g. for a colour printer). Alternatively, more than one pixel may be stored in each memory location, according to the number of bits per pixel and the width of the memory. 4 bits, 2 bits and 1 bit per pixel may be particularly suitable, because the extra conversion is a shift. Some processor architectures are highly optimised for bit shifting, for example the ARM processor, and may perform a shift in the same instruction as a load or add. Preferably the processing comprises using the nozzle position data as a pointer into the image memory space to read pixel data for each nozzle from the memory. Preferably print resolution data is read, for example a number in dots per inch, and the image is converted into pixelated image data at that resolution by scaling the image up or down in size according to the magnitude of the print resolution and the native resolution of the printer, this pixelated image data being stored in the image memory space.

The head position data may be provided in terms of a pixel position, thereby allowing a direct reference to the image data without first converting the head position data into a pixel position.

Preferably the nozzle position data describes the spatial position of the nozzles on the print head with respect to a known reference, for example a sweep direction of the print head or a line feed direction of the printer mechanism, and the print head is oriented neither parallel nor perpendicular to either of these references, but at another angle such as between 5 and 85 degrees, for example 15, 30 or 45 degrees. Preferably the method further comprises inputting print head data for a succession of print head positions, for example as the print head sweeps across the page, and outputting firing data for each position to control the ink jet printer to print the portion of the image. Alternatively the method may comprise inputting clock data from the printer, indicating a succession of print head positions, and outputting firing data for those positions. Preferably the succession of print head positions defines a raster scan for printing by the print head.

This allows generating data for a multiple head ink jet printer, by generating data for driving each head using the previous method, and printing multiple portions of the image using the multiple print heads from the same image data. Alternatively, the print heads may be locked at a fixed distance relative to one another, and a single nozzle position matrix may be used having position data for both print heads.

The invention further provides a method of printing using an ink jet print head having a plurality of nozzles to print at least a portion of an image comprising a plurality of pixels, the method comprising: storing nozzle position data prior to said printing, said nozzle position data defining spatial positions of said nozzles with respect to said print head in terms of pixel offsets from a reference position on said print head; and afterwards printing said portion of said image by: reading image data for said image, said image data comprising data for said plurality of pixels; inputting head position data defining a position for said print head; processing said pixel image data using said head position data and said nozzle position data to determine nozzle firing data for controlling said print head to deposit ink at said spatial positions of said nozzles with respect said head position in accordance with said image data, said processing including associating said nozzle position data in terms of pixel offsets with said pixels of said image; and driving said print head using said determined nozzle firing data.

Embodiments of the above-described methods may further comprise measuring and correcting for one or both of substrate rotation and substrate offset during printing.

The invention further provides processor control code to implement the above-described methods, for example on a general purpose computer system or on a digital signal processor (DSP). The code may be provided on a carrier such as a disk, CD- or DVD-ROM, programmed memory such as read-only memory (Firmware), or on a data carrier such as an optical or electrical signal carrier. Code (and/or data) to implement embodiments of the invention may comprise source, object or executable code in a conventional programming language (interpreted or compiled) such as C, or assembly code. The above described methods may also be implemented, for example, on an FPGA (field programmable gate array) or in an ASIC (application specific integrated circuit). Thus the code may also comprise code for setting up or controlling an ASIC or FPGA, or code for a hardware description language such as Verilog (Trade Mark), VHDL (Very high speed integrated circuit Hardware Description Language), or RTL code or SystemC. Typically dedicated hardware is described using code such as RTL (register transfer level code) or, at a higher level, using a language such as C. As the skilled person will appreciate such code and/or data may be distributed between a plurality of coupled components in communication with one another.

According to another aspect of the present invention, there is provided a method of generating nozzle position data for a print head, said nozzle position data defining spatial positions of said nozzles with respect to said print head in terms of pixel offsets from a reference position on said print head, and wherein said pixel offsets are defined with reference to a pixel spacing corresponding to a defined spatial resolution of an image to be printed by said print head.

According to a further aspect of the present invention, there is provided a carrier carrying a memory array storing nozzle position data for a print head, said nozzle position data defining spatial positions of said nozzles with respect to said print head in terms of pixel offsets from a reference position on said print head; and wherein said pixel offsets are defined with reference to a pixel spacing corresponding to a defined spatial resolution of an image to be printed by said print head.

The carrier may comprise a memory chip such as a read only memory (ROM), a flash memory or a battery-backed up static RAM. The memory chip may have a parallel interface or, preferably, a serial interface for a smaller number of connections to the memory.

According to a yet further aspect of the present invention, there is provided an image processing engine for generating data for driving an ink jet print head having a plurality of nozzles to print a portion of an image comprising a plurality of pixels, said image processing engine being configured to: store nozzle position data defining spatial positions of said nozzles with respect to said print head in terms of pixel offsets from a reference position on said print head; read image data for said image, said image data comprising data for said plurality of pixels; input head position data defining a position for said print head; and process said image data using said head position data and said nozzle position data to determine nozzle firing data for controlling said print head to deposit ink at said spatial positions of said nozzles with respect said head position in accordance with said image data.

Features of the above-described aspects and embodiments of the invention may be embodied in any permutation.

BRIEF DESCRIPTION OF THE DRAWINGS

These and other aspects of the invention will now be described in further detail, with reference to the accompanying drawings, in which.

DETAILED DESCRIPTION OF PREFERRED EMBODIMENTS

Figure 1:
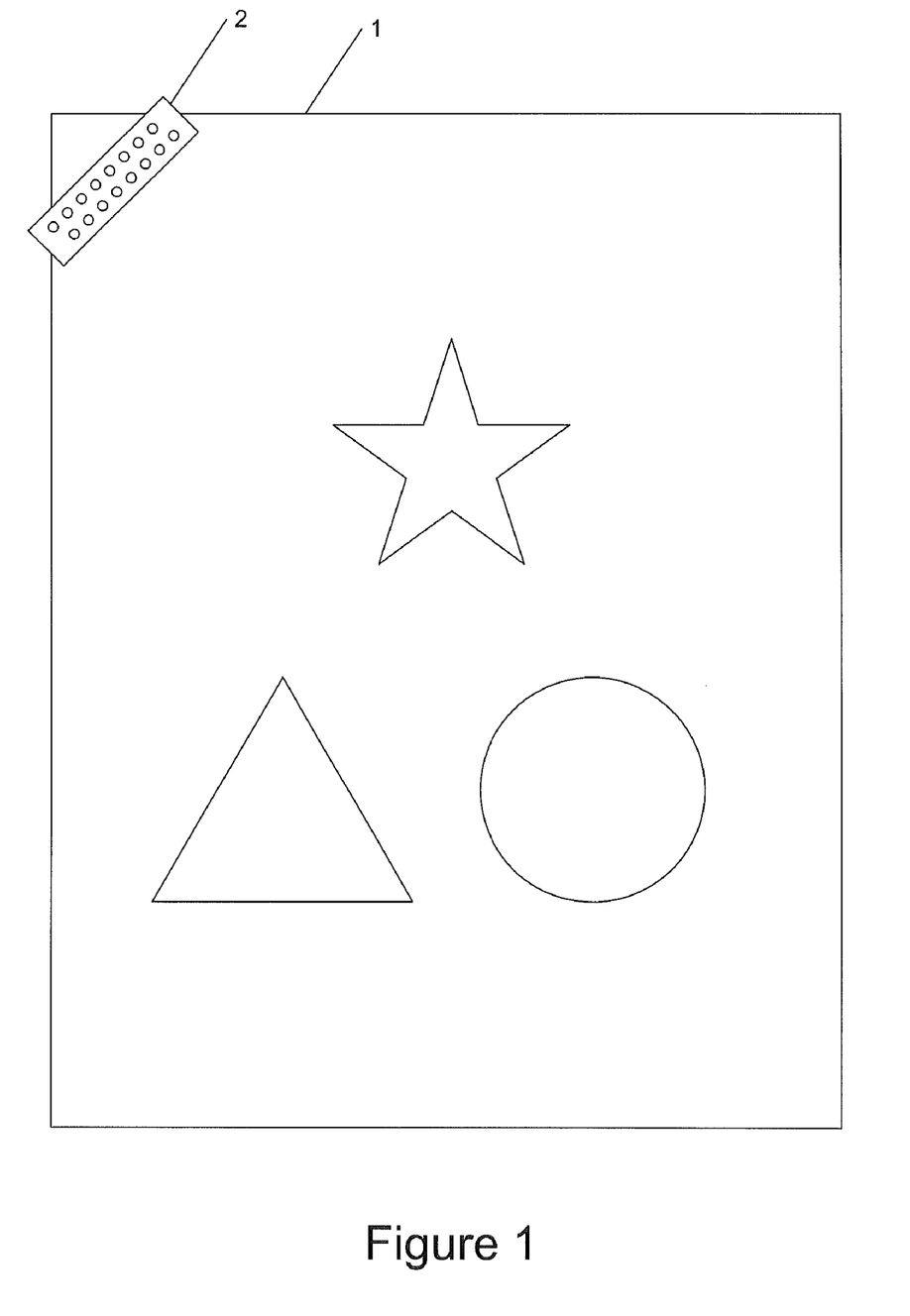
FIG. 1 shows a print head 2 positioned at a corner position over a piece of paper.

FIG. 1 shows a print head 2 positioned at a corner position over a piece of paper 1 with an exemplary image printed on it. The long axis of the print head is oriented at an angle of approximately 45 degrees to the long axis of the paper. In general, the print head may be oriented at any angle to the paper, the choice of angle providing a trade off between the area covered by the print head in one sweep of the paper and the resolution of an image printed by the print head.

Figure 2:
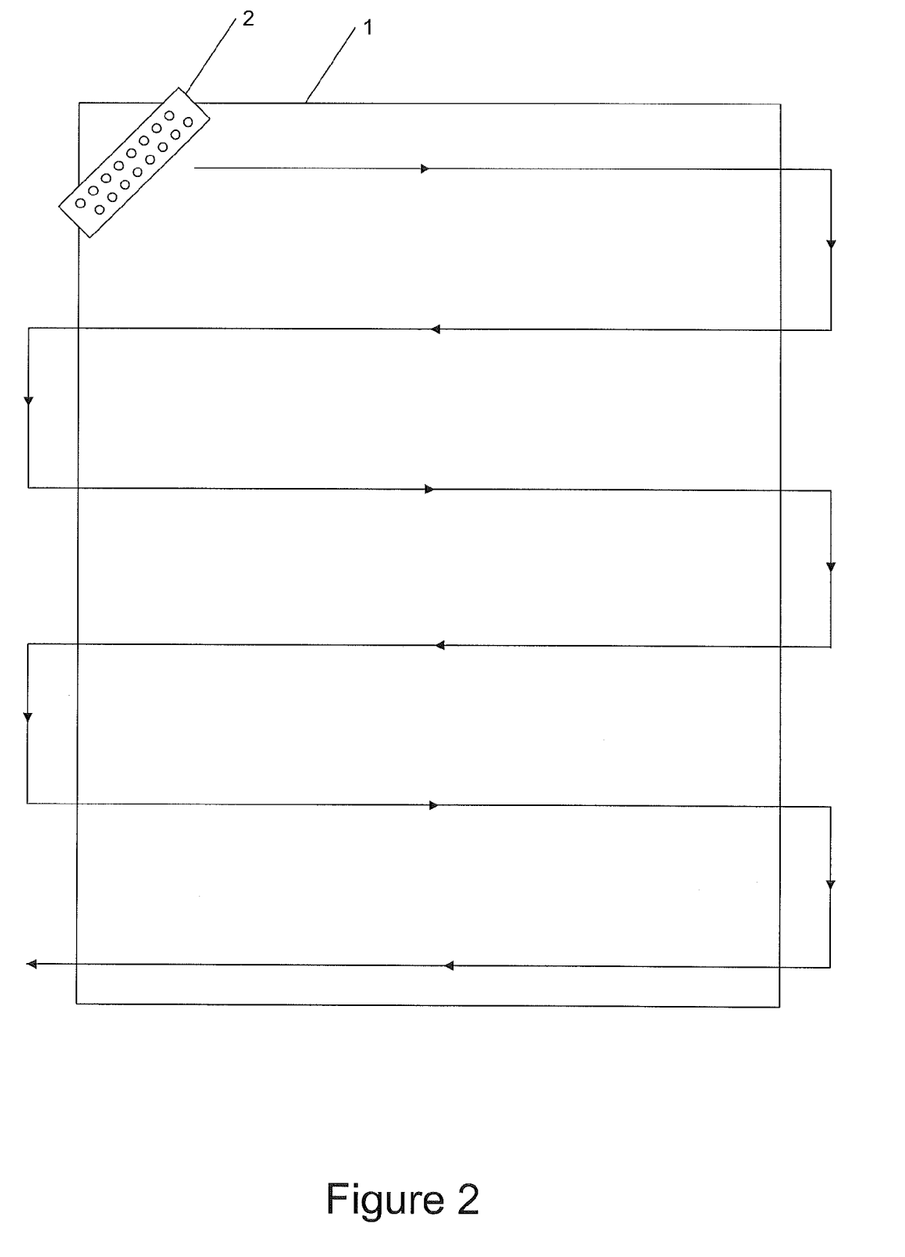
FIG. 2 shows an example print path followed by the print head of FIG. 1 over the paper.

FIG. 2 shows an example print path followed by the print head of FIG. 1 over the paper. In this example the print head has 16 nozzles, so it may print 16 pixel high strips across the page. The print head then moves down the page and prints another 16 pixel high strip below the first one, optionally with a gap between the two strips (if, for example, the printer is printing lines of text with spaces between the lines). Alternatively, the print head may move down and print a 16 pixel high strip in between the previous pixels, a technique known as interlace or interleaved printing. In this example printing on the second line occurs in the reverse direction to the first, so the controller sending data to the print head must allow for this when fetching image data for printing. As will be apparent to one skilled in the art, other print paths, print head orientations and print head configurations are also possible.

Note that the nozzles, when swept across the page, print in a series of lines. However, they do not all reach the start of the page at the same time when the print head sweeps from left to right; indeed a print head position when the top-most nozzle is over the left-hand edge of the page is different from a print head position when the bottom-most nozzle is over the left-hand edge of the page. This is the case for two reasons; firstly the print head is oriented at an angle to the page, and secondly the nozzles are staggered along the print head. Staggering is often done because the nozzle connections to the mechanism controlling the firing of the nozzles often occupy more space than a droplet size from the nozzle on the printed page, so it is difficult or impossible to arrange the nozzles in a straight line. However, this means that a controller driving the print head may send data for the first pixel on the left edge of the page at different times for each nozzle, thereby increasing the complexity of the controller.

Figure 3:
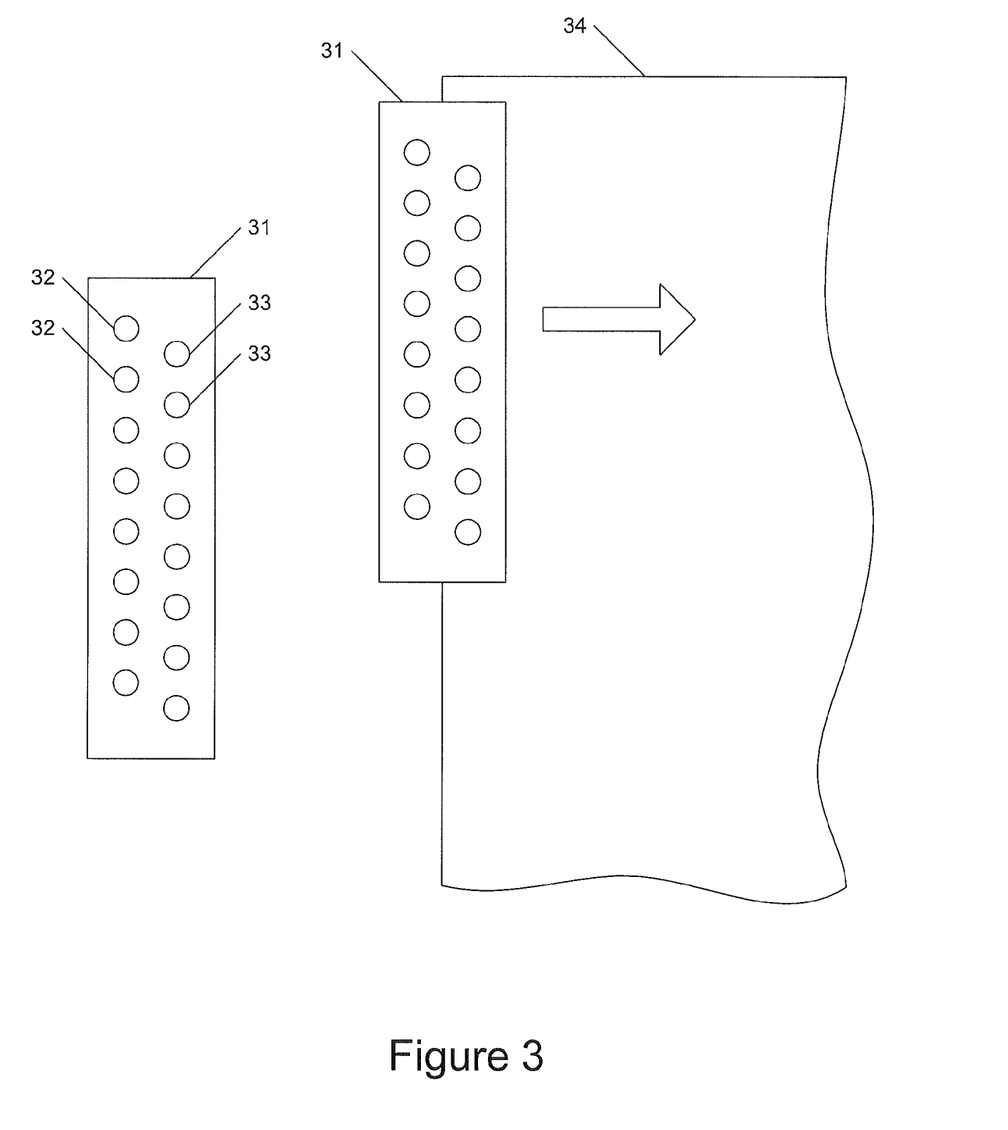
FIG. 3 shows a close-up diagram of an exemplary ink jet print head.

FIG. 3 shows a close-up diagram of an exemplary ink jet print head 31, this time oriented parallel to a long axis of page 34. Again in this example, the nozzles are staggered, with nozzles 32 on the left-hand side of the print head being disposed one pixel higher on the print head than nozzles 33 on the right-hand side of the print head. In this example, as the print head sweeps from left to right across the page, nozzles 33 may fire earlier in the sweep than nozzles 32, because of a 2 pixel lateral displacement between the sets of nozzles. Note that the spacing between the nozzles is fixed in terms of millimeters, but may vary in terms of pixels depending on the resolution of the image being printed. The droplet size may also vary according to the resolution, as well as other factors such as the density required. Therefore the controller in the printer may account for these factors when sending image data to the print head for printing. Typically the nozzles all fire together at the same time, controlled by a firing pulse, and the data sent to the print head determines the amount of ink deposited by each individual nozzle, and whether or not the nozzle should fire. Clearly there will be some situations where one nozzle is off the edge of the page and should not fire, whereas another nozzle is located over a dark portion of the page in the desired image and should fire.

Figure 4:
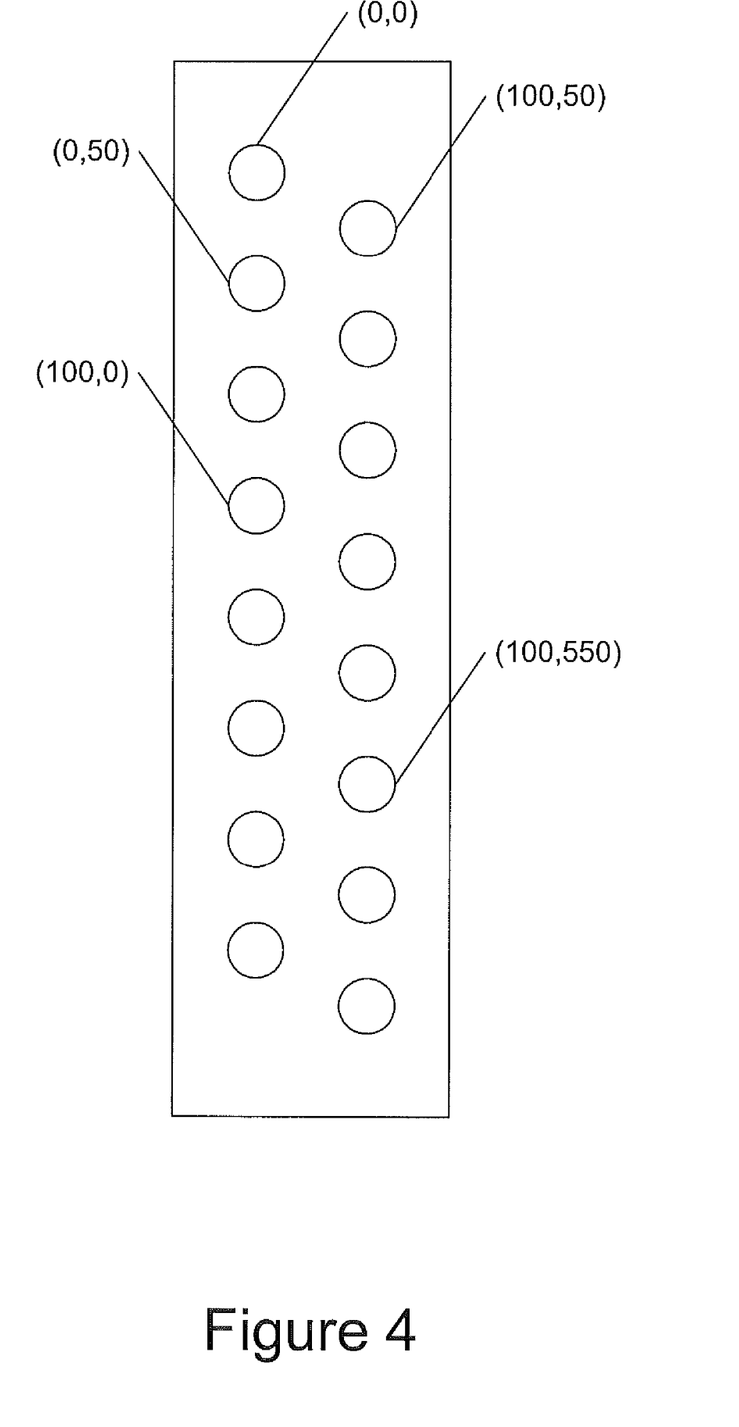
FIG. 4 shows the print head of FIG. 3 with examples of nozzle positions relative to the top-left nozzle on the print head.

FIG. 4 shows the print head of FIG. 3 with examples of nozzle positions relative to the top-left nozzle on the print head calibrated in thousandths of an inch (thou.). This information may be provided by the manufacturer of the print head. Conventional ink jet printers are designed for one particular print head and one particular print head orientation, so that software written for the controller in one printer may not work with a different print head, nor even the same print head at a different orientation.

Figure 5:
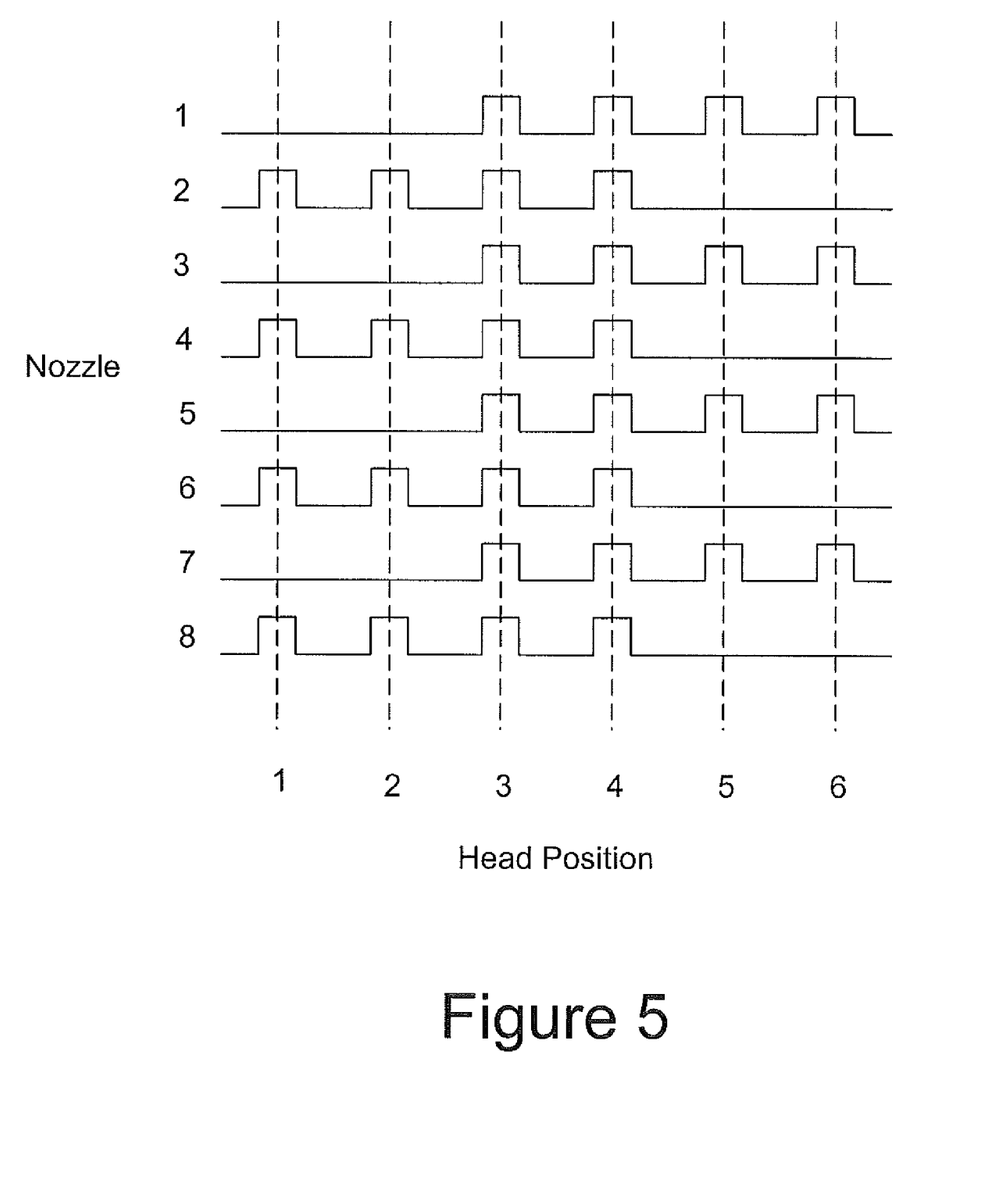
FIG. 5 shows firing pulses for a print head having eight nozzles (voltage against time)

FIG. 5 shows firing pulses for a print head having eight nozzles (voltage against time). This example corresponds to the top eight nozzles of the print head in FIG. 3; nozzles 2, 4, 6 and 8 start firing 2 pixels before nozzles 1, 3, 5 and 7. Note that the relationship between the firing pulses for different nozzles need not be an integer relationship, although it is more convenient for this to be the case since it allows a single clock reference source to be used for all the nozzles. Note also that the firing pulses shown here indicate whether or not a nozzle should fire, not the actual volume of ink the nozzle should fire (which may in fact be zero).

The controller receives image data to be printed and optionally a resolution (e.g. dots per inch) in which the image should be printed. By default it may assume a one-to-one relationship—e.g. one printed dot per pixel in the image. Alternatively it may scale the image up or down by calculating, for each pixel position on the page, which is the nearest pixel in the image data. This image data is then converted into nozzle firing data for sending to the print head, including information on the density of the dot required at each printing position and also whether or not a firing pulse should be sent to the nozzle at each printing position. Because the controller software is written for one particular print head and print head orientation, it may only be useful for that particular printer, and in particular it means that the controller software must be rewritten whenever a different print head is used or a different print head orientation is used. Providing a printer with a range of interchangeable print heads or with user-adjustable print head orientations becomes troublesome because the controller must be reconfigured for each combination, which may involve uploading different firmware to the printer each time the print head configuration is changed. Manufacturers would be more likely not to offer this flexibility, due to the extra volume of support calls it could create.

Instead of providing dedicated controller software for each combination of printer mechanism, print head and print head orientation, we will describe separating out the code portions of the controller software from the nozzle data portions. These may be supplied separately to the printer, with the controller software being provided with the mechanism as part of the printer and the print head nozzle data being provided with the print head, for example on a carrier such as a read only memory chip. We will describe a raster image processor suitable for use with such a print head.

Figure 6:
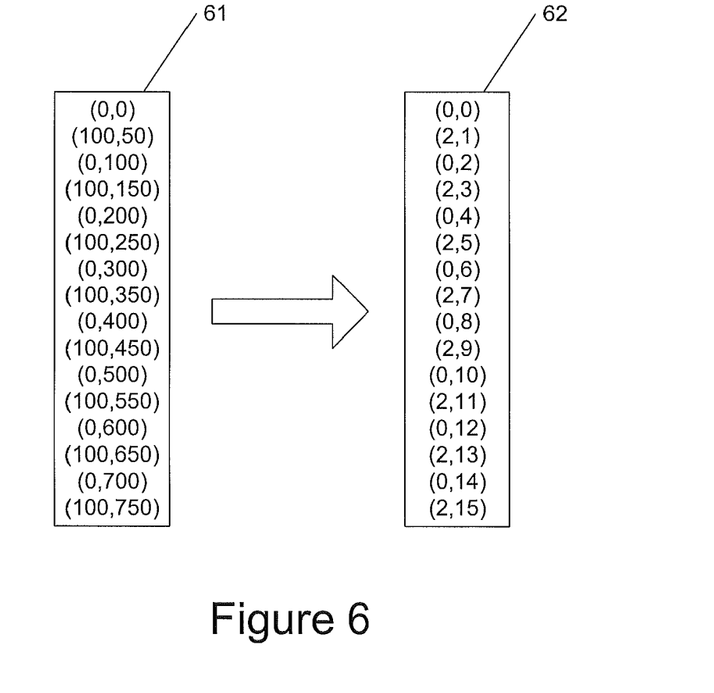
FIG. 6 shows a matrix of print head nozzle positions and a matrix of printing offsets according to an embodiment of an aspect of the present invention.

FIG. 6 shows an array of print head nozzle positions in thou. as a matrix (on the left) for the print head of FIG. 4, and an array of printing offsets in pixels as a matrix (on the right) which has been generated according to the present invention. The elements of the matrices may be in an arbitrary order, or they may be in a particular order, such as an order for sending image data to the print head driver, i.e. the order in which the print head driver expects to receive data for each of its nozzles. This order may be provided on the memory chip, in order to indicate to the printer in which order to send the data to the print head driver, or the controller software may ignore the order of the data in the memory chip, if (for example) the print head driver is part of the printer mechanism and does not vary with the type of print head fitted.

Figure 7:
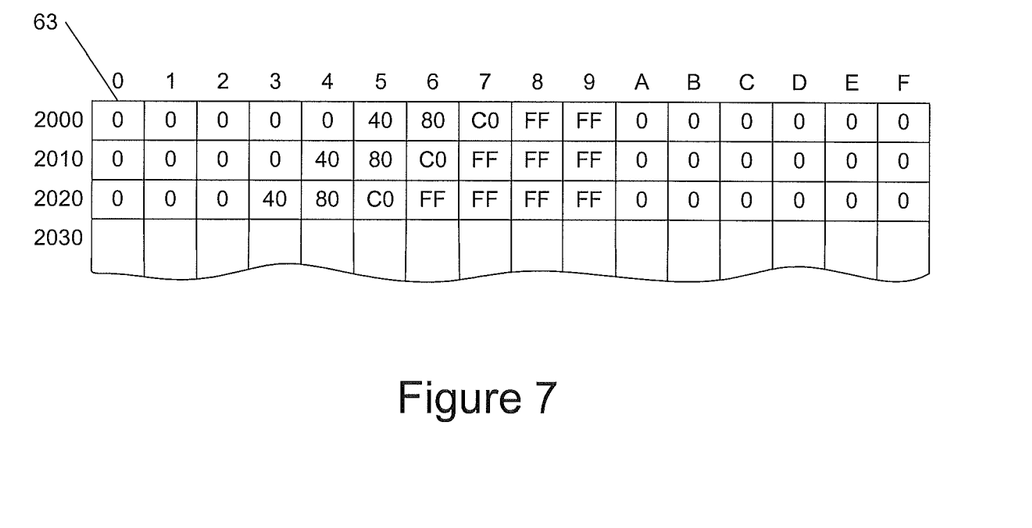
FIG. 7 shows an example of image data in memory for an image to be printed by a method of printing an image according to an embodiment of an aspect of the present invention.

FIG. 7 shows image data for an example image to be printed, starting at location 2000h in memory. In this example the image is 16 pixels wide and data for a height of 3 pixels is shown, though the image data may continue at location 2030h for a greater height. The values are 8 bit bytes, indicating 256 levels, and there is only one value per pixel indicating a monochrome image. As will be apparent to one skilled in the art, these examples are merely intended to be exemplary; other values are also possible. A method of printing according to the present invention may work by determining an address ($A_R$) corresponding to a present position of a reference position on the print head (e.g. the address of the location containing image data for the top left nozzle on the print head), and adding the offset values ($O_X$, $O_Y$) scaled by the appropriate width (W) and bit depth (D) constants to this address to obtain the addresses ($A_N$) of the locations containing image data for the other nozzles. This may be done using the following formula:

$$A_N = A_R + D \cdot O_X + D \cdot W \cdot O_Y$$

Thus, the pixel data for the nozzles may be obtained using the present location of the print head, which may be known because the mechanism is under the control of the controller software, the bit depth of the image, which depends on the image data sent to the printer, the width of the image, which depends on the image data sent to the printer and optionally the resolution desired, and the matrix of pixel offset values.

These calculations may be performed very quickly using modern processor hardware, and depending on the size a memory access pattern generated by this method, memory accesses may fit within a cache size of the processor, improving the overall performance of the system. Optionally bounds checking may be performed after adding $D \cdot O_X$ and again after adding $D \cdot W \cdot O_Y$ in order to check that the particular nozzle is not out of range of the image (e.g. outside the printing area of the page). This may be omitted if it is known that the nozzles will not need to be fired when one is outside the printing area (for example with a print head aligned to either side of the image). Alternatively the expression $D \cdot O_X + D \cdot W \cdot O_Y$ may be precalculated for each nozzle to obtain a single nozzle offset No which may be added to $A_R$ to yield $A_N$ for that nozzle. This means that each pixel look-up may be performed with just an add operation and a memory fetch. In order to prevent memory accesses occurring out of bounds when the print head is at one of the edges of the image (so that, for example, some of the nozzles are off the edge of the image), the image data may be padded with a border at one or more of the sides (left, right, top and bottom). The width parameter W may be adjusted to include any side borders and the method may fetch data indicating no printing is to take place for those nozzles.

Figure 8:
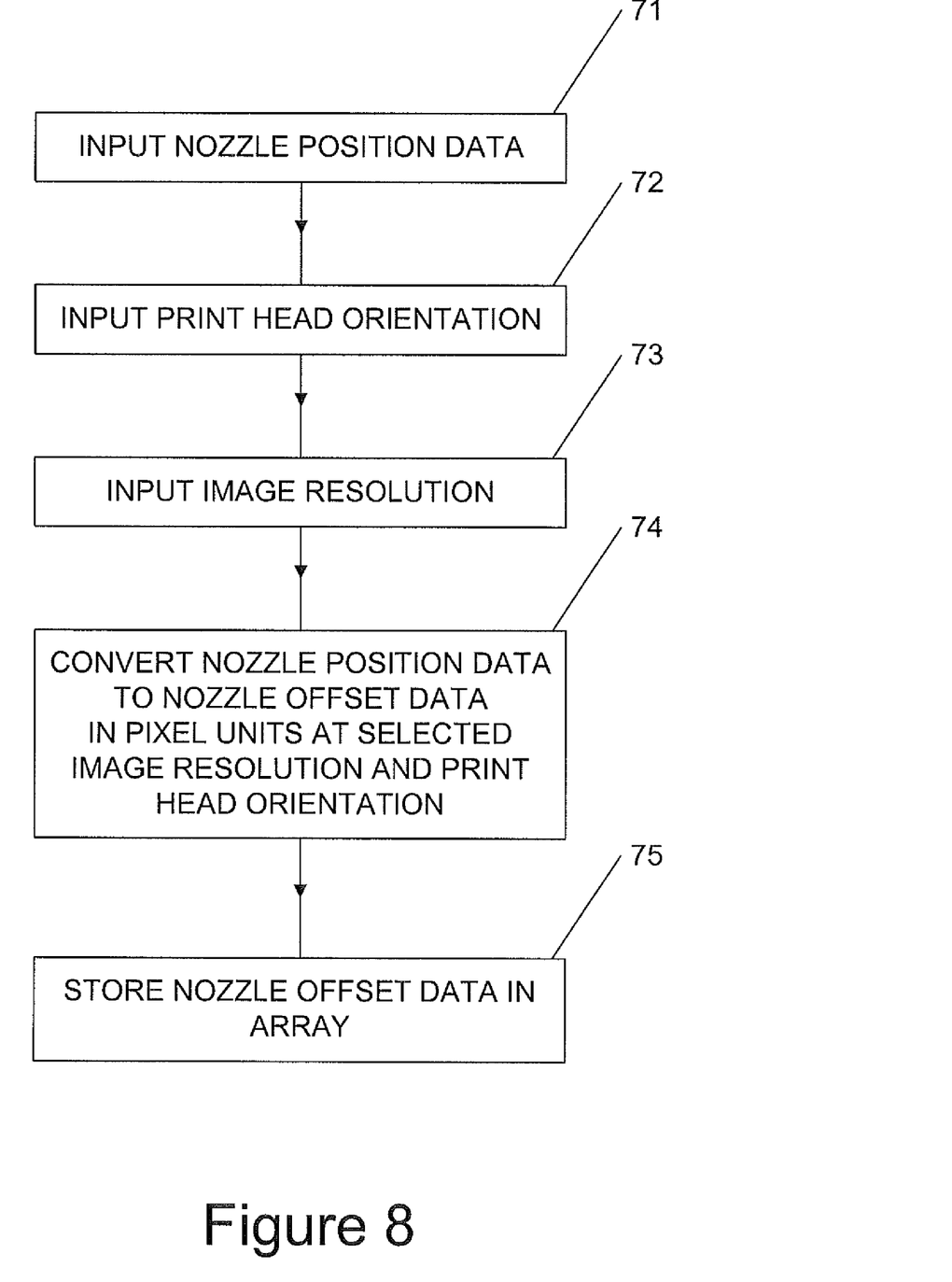
FIG. 8 shows a flowchart for a method of generating print head nozzle offset data according to an embodiment of an aspect of the present invention.

FIG. 8 shows a method of calculating the array of printing offsets in FIG. 6. The method starts (71) with data corresponding to the position of nozzles ($P_X$, $P_Y$) on the print head relative to a reference, e.g. the top-left nozzle on the print head. This data may be provided in units of length, e.g. thousandths of an inch (thou.), millimeters (mm) or another other unit known in the art. At step 72, the print head orientation ($\theta$) is received; this may be provided in degrees, radians or any other angle unit known in the art. This step is optional; alternatively the system may assume a fixed offset and different angles may be provided for similar print heads by providing different mouldings to attach the print head to the mechanism and providing different nozzle position arrays for each of these mouldings. At step 73 the image resolution (R) is received, in dots per inch or any other unit known in the art. This step is also optional; the system may assume a fixed relationship between input image data and desired resolution, but in most embodiments this step is present because it is useful for a printer to be able to print the same image at different resolutions. The resolution may be different in X and Y directions, and two resolution parameters $R_X$ and $R_Y$ may be used for this purpose. At step 74 the nozzle position data in units of length is converted to nozzle offset data in units of pixels, by scaling the position data according to the resolution required and, if desired, transforming the results according to the print head orientation. This is shown by the following formula:

$$\begin{pmatrix} O_X \\ O_Y \end{pmatrix} = \begin{pmatrix} \cos\theta \sin\theta \\ -\sin\theta - \cos\theta \end{pmatrix} \left( R \cdot \begin{pmatrix} P_X \\ P_Y \end{pmatrix} \right)$$

Scalar multiplication and matrix multiplication may be used, respectively, for this purpose. The operations may be carried out in the reverse order, making no difference to the result, because scalar multiplication is commutative.

A graphical user interface (GUI) may be provided to configure the inputs to this method. For example, in printers with an adjustable print head orientation, the user may set the orientation (θ) and then configure the printer using a GUI for entering the print head orientation. Alternatively, the print head mechanism may detect the orientation of the print head automatically and send the result to the printer for generating the nozzle offset data accordingly. The interface may also provide an adjustable print resolution control, for configuring the image resolution (R) in this method.

Finally the results are stored as an array, for example in RAM in the printer, or in ROM on a memory chip associated with the print head. Contacts for reading out the contents of the memory chip may be provided on the print head interface along with contacts for sending data to the nozzle drivers. Serial memory chips such as EEPROMs are particularly suitable for this purpose as they have only a small number of electrical contacts (e.g. 8) and occupy a small area on a circuit board, and their relatively small size may be more than sufficient for storing the nozzle offset array data.

Figure 9:
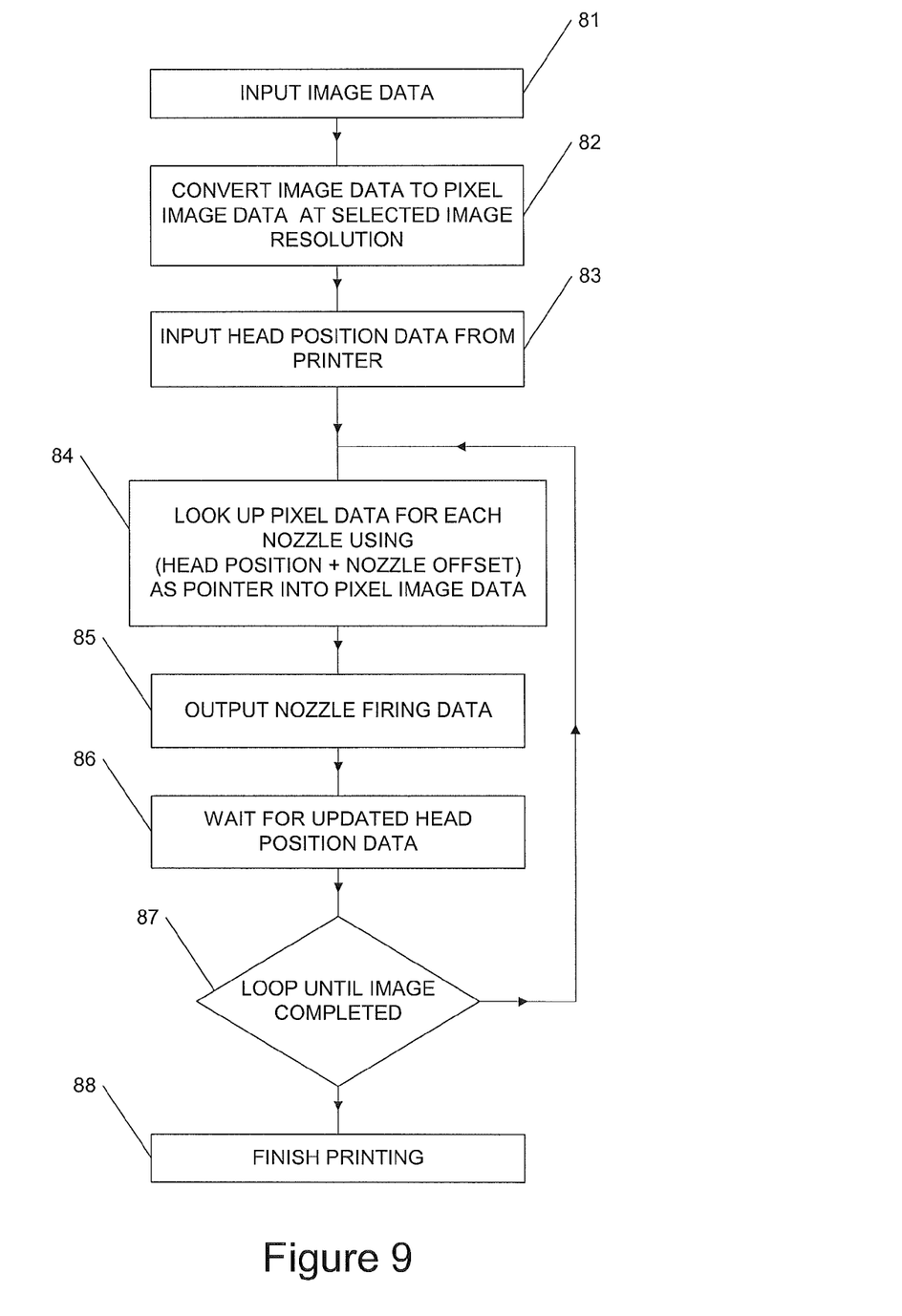
FIG. 9 shows a flowchart for a method of printing an image according to an embodiment of an aspect of the present invention.

FIG. 9 shows a method of printing image data using a nozzle offset array generated by the method of FIG. 8. The method starts (81) with the image data for the image to be printed. This is then optionally scaled to an appropriate size according to the image resolution selected (e.g. in dots per inch) at step 82. At step 83 the printer is ready to begin printing. Head position data is input from the printer, which at this point will be at the start point for printing (for clarity, the step of moving the print head to this position is omitted here). Step 84 looks up pixel data for each nozzle using the formula for $A_N$, and step 85 outputs the pixel data to the print head driver. This data may include data indicating whether or not the nozzle should fire, as well as or instead of the image intensity for that nozzle. At step 86 the printer waits to receive a signal from the printer that the print head is at the next printing position; this may be indicated by the sending of new position data, or it may be indicated by a clock signal, for example an encoder pulse signal or a firing pulse signal, indicating that the printer has moved onto the next pixel. At step 87 the method loops back to step 84 until the printer has finished printing the image (step 88).

No doubt many other effective alternatives will occur to the skilled person. It will be understood that the invention is not limited to the described embodiments and encompasses modifications apparent to those skilled in the art lying within the spirit and scope of the claims appended hereto.

The invention claimed is:

1. A method of generating data for driving an ink jet print head having a plurality of nozzles to print a portion of an image comprising a plurality of pixels, the method comprising:
   storing nozzle position data defining spatial positions of said nozzles with respect to said print head in terms of pixel offsets from a reference position on said print head;
   reading image data for said image, said image data comprising data for said plurality of pixels;
   inputting head position data defining a position for said print head;
   processing said image data using said head position data and said nozzle position data to determine nozzle firing data for controlling said print head to deposit ink at said spatial positions of said nozzles with respect to said head position in accordance with said image data; and
   further comprising storing said image data in pixel order in an image memory space using a memory location for each pixel, and wherein said processing comprises using said nozzle position data as a pointer to said image memory space storing said image data to read pixel data for each said nozzle from said memory space.

2. A method as claimed in claim 1 further comprising reading print resolution data, and converting said image data into pixelated image data at said print resolution, and wherein said storing of said image data into said image memory space comprises storing said pixelated image data into said image memory space.

3. A method as claimed in claim 1 wherein said nozzle position data defines said spatial position of said nozzles with respect to a defined orientation, of said print head offset from a defined printing direction of said print head, and wherein said orientation is neither parallel nor perpendicular to said printing direction.

4. A method as claimed in claim 1 further comprising inputting said head position data for a succession of said print head positions, and outputting said firing data for each said position to control an ink jet printer including said print head to print said portion of said image.

5. A method as claimed in claim 4 wherein said succession of said print head positions defines a raster scan for printing by said print head.

6. An image processing engine for generating data for driving an ink jet print head having a plurality of nozzles to print a portion of an image comprising a plurality of pixels, said image processing engine being configured to:
   store nozzle position data defining spatial positions of said nozzles with respect to said print head in terms of pixel offsets from a reference position on said print head;
   read image data for said image, said image data comprising data for said plurality of pixels;
   input head position data defining a position for said print head; and
   process said image data using said head position data and said nozzle position data to determine nozzle firing data for controlling said print head to deposit ink at said spatial positions of said nozzles with respect to said head position in accordance with said image data;

wherein said image processing engine is further configured to store said image data in pixel order in an image memory space using a memory location for each pixel, and wherein said image processing engine is further configured to process said image data using said nozzle position data as a pointer to said image memory space storing said image data to read pixel data for each said nozzle from said memory space.

7. An ink jet printing system including the image processing engine of claim 6.

* * * * *